Aug. 29, 1972  M. S. CHASE  3,687,770

PICTURE MAT AND MOUNT METHOD AND ARTICLE

Filed May 1, 1970  5 Sheets-Sheet 1

INVENTOR
MARSTON CHASE
BY [signature]
ATTORNEY

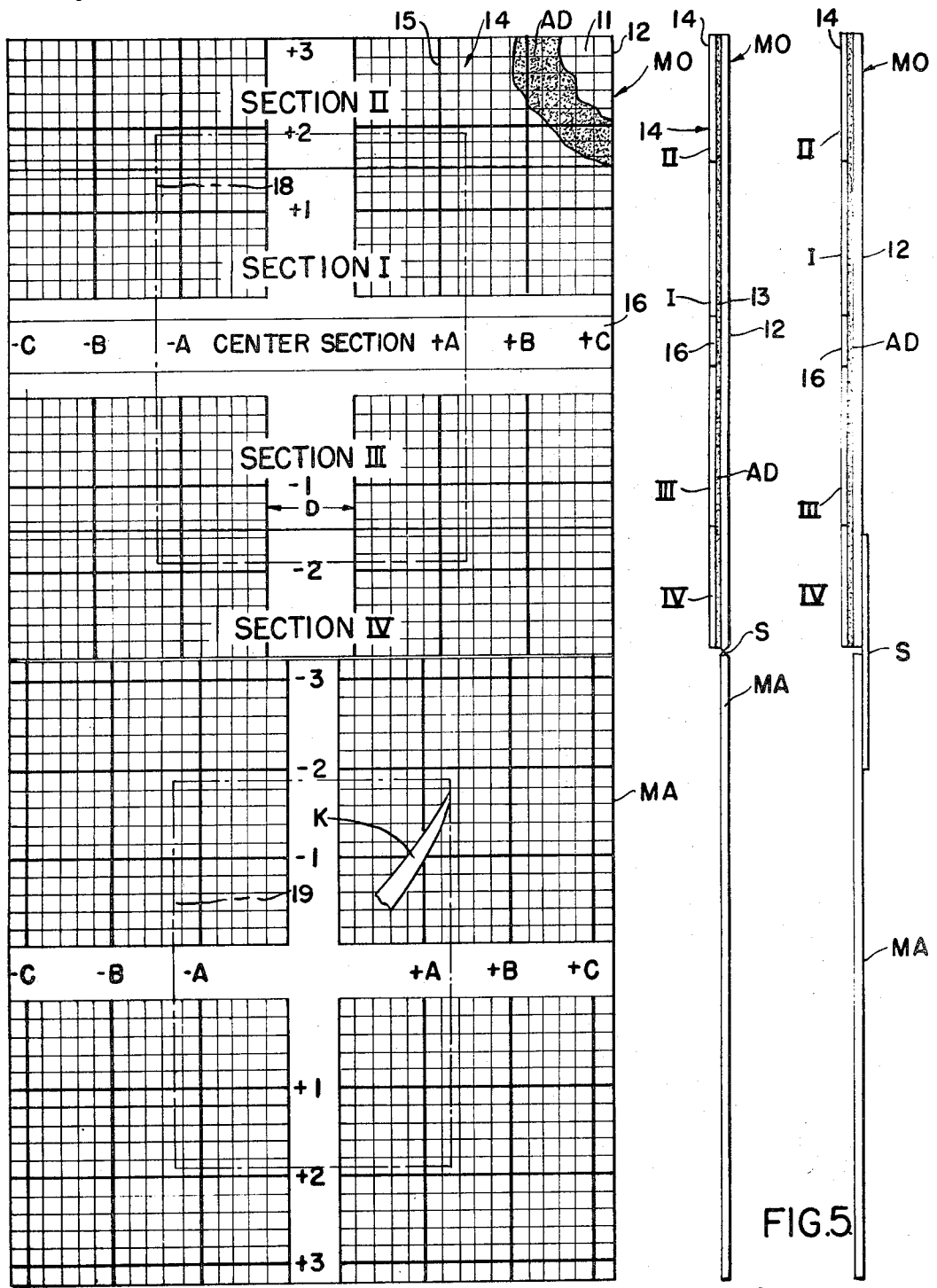

INVENTOR
MARSTON CHASE
BY Munson H. Lane
ATTORNEY

United States Patent Office 3,687,770
Patented Aug. 29, 1972

3,687,770
PICTURE MAT AND MOUNT METHOD
AND ARTICLE
Marston S. Chase, P.O. Box 19168,
Washington, D.C. 20036
Filed May 1, 1970, Ser. No. 33,776
Int. Cl. G09f 1/10
U.S. Cl. 156—221                           26 Claims

ABSTRACT OF THE DISCLOSURE

Materials and a method for mounting a picture in accurate relation on a sheet of mount material and providing a mat with a picture viewing opening of the correct size to frame the picture and provide the proper overlap of the mat onto the edges of the picture adjacent the picture viewing opening, thereby making a neat mounted and matted picture. The mount is provided with coordinate guide means marking equal distance intervals extending horizontally and vertically in opposite directions from intersecting horizontal and vertical axes through a selected central point on said mount, identifying means for selected of said coordinate guide means, and a sheet of mat material having coordinate guide means and identifying means similar to the coordinate guide means and identifying means on said mount for use as guides in cutting the picture viewing opening through the mat material, the coordinate guide means and identifying means on said mat material corresponding to the coordinate guide means and identifying means on said mount being closer to said horizontal and vertical axes by the amount of the desired overlap of the mat onto the edges of the picture at the edges of the picture viewing opening.

---

The present invention relates to the picture mounts of the type shown in application Ser. No. 690,858, filed Dec. 15, 1967, now Pat. 3,517,106 issued June 23, 1970 and priority of the common subject matter is incorporated herein by reference.

Heretofore, pictures have been mounted and matted in various ways which required a high degree of skill and necessitated careful measurement and drawing of lines on the face of the picture mount to properly locate the picture with respect to the mount, and on the face or back of the mat material to properly locate the picture viewing opening in the mat with respect to the picture on the mount and to provide the proper amount of overlap of the mat onto the picture at the edges of the picture viewing opening. The prior art, mounting methods and materials were therefore not entirely satisfactory.

An object of the present invention is to provide materials and methods which overcome the objections of the prior art.

Another object is to provide materials and methods which can be used by relatively inexperienced persons to obtain professional results.

Other and further objects will be apparent as the description proceeds and upon reference to the drawings wherein:

FIG. 3 is a plan view of a mount with a sheet of mat material hingedly connected thereto and showing a grid coordinate system on the front of the mount and on the back of the mat material with the grids of the mat material positioned closer together or offset inwardly by the amount of the overlap of the mat onto the picture at the edges of the picture viewing opening;

FIG. 4 is a side elevation of the combination mount and mat material of FIG. 3 showing a scored portion providing the hinge connecting the mount and mat material;

FIG. 5 is a side elevation of a modified form showing a separate hinge strip connecting the mat material and mount;

Figure 1:
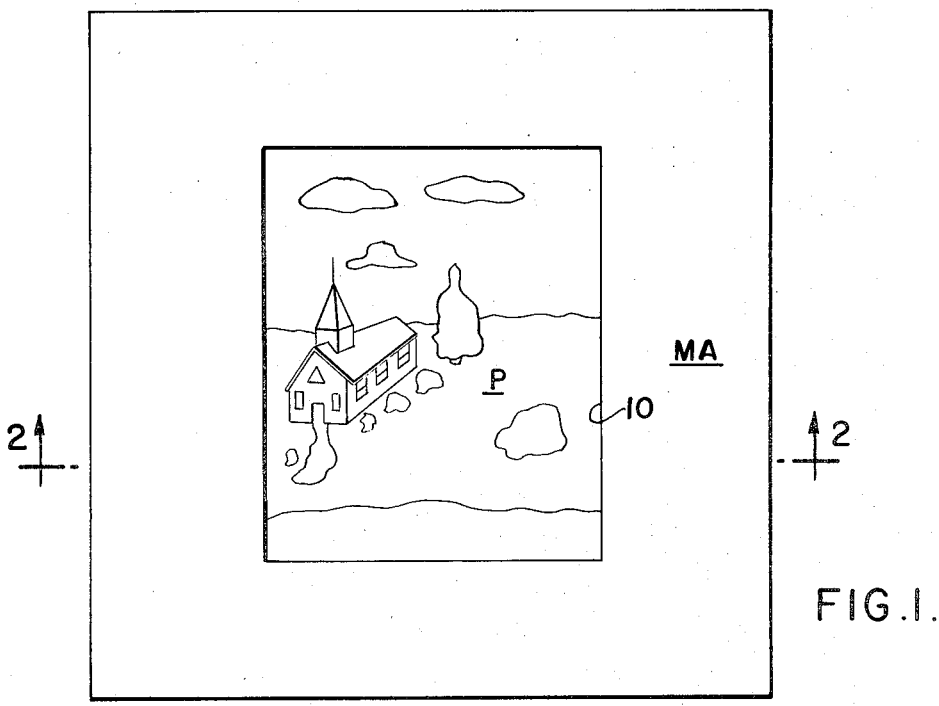
FIG. 1 is a front view of a picture mounted and matted by the method and with the products of the present invention.
Figure 2:
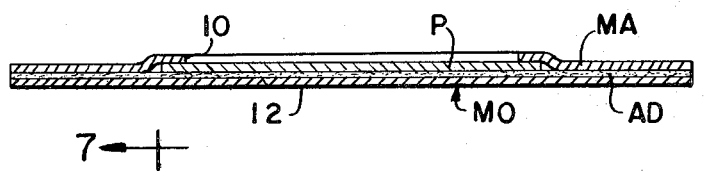
FIG. 2 is a section taken along line 2—2 of FIG. 1, showing the picture and the mat secured to the adhesive layer on the mount.

A completed, mounted and matted picture P is shown in FIGS. 1 and 2 where the mount MO consisting of base sheet 12 and adhesive layer AD, and the mat MA, with picture-viewing opening 10, are secured together by the adhesive layer AD.

In FIG. 3 the mount MO is provided with a grid coordinate system 11 printed on one surface of the base 12. The mount also includes a layer of pressure-sensitive adhesive AD covered with a cover release sheet 14 which release sheet is also imprinted with a grid coordinate system 15 which is identical with the grid coordinate system 11 and superimposed thereon and in registry therewith. The release sheet 14 includes a narrow center section 16 and wide sections I, II, III and IV that completely cover the adhesive layer AD on the base 12 of the mount MO and are detachably secured thereto by the adhesive layer AD. Grid coordinate systems 11 and 15 include four quadrants with the quadrants of the mount spaced apart a suitable distance D and heavy vertical grid lines thereof identified with letters A, B, C, −A, −B, −C, and the horizontal heavy grid lines identified by numerals 1, 2, 3 and −1, −2, −3.

It is within the scope of this invention that coordinate guide means such as the grid coordinates shown in FIG. 3 may be imprinted on at least one of either the cover release sheet 14 or the mount base 12. If the coordinate guide means are imprinted on the mount base the adhesive AD should be transparent. The coordinate guide means may be imprinted on either of the release sheet or the base separately or on both the release sheet and the mount base.

Figure 6:
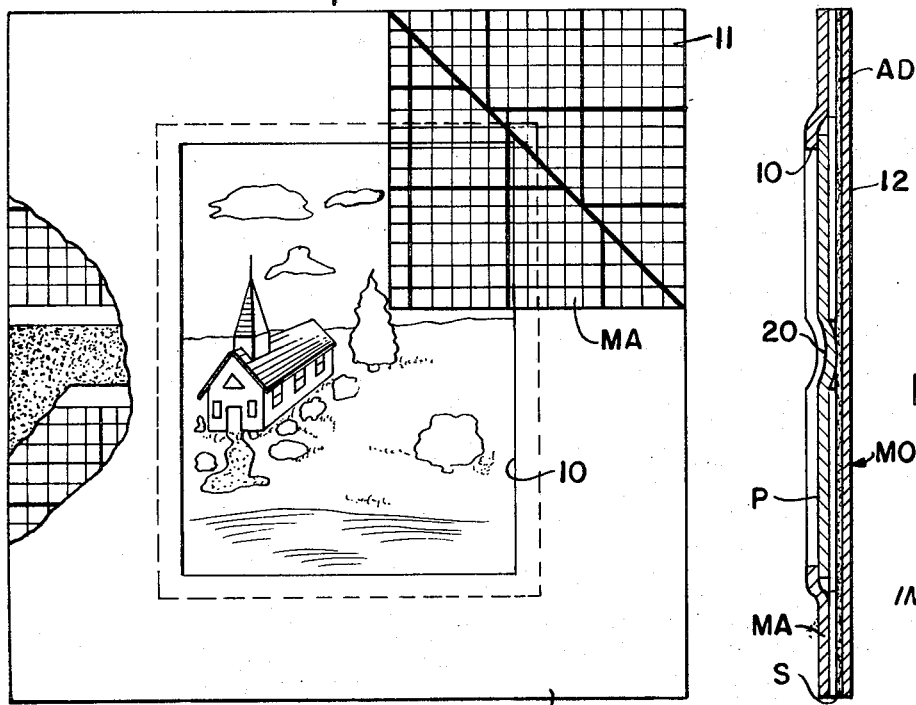
FIG. 6 is a plan view of a mount, picture and mat in the initial stages of assembly with the center strip of the cover release sheet removed and parts broken away to show the mount and with the upper right corner of the mat folded back to show the relation of the grid coordinate system on the back of the mat and the grid coordinate system on the front of the mount.
Figure 7:
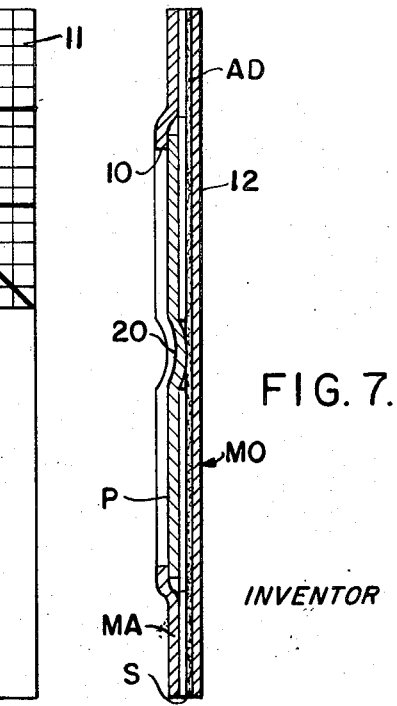
FIG. 7 is a section taken on line 7—7 of FIG. 6 showing the picture and the mat preliminarily attached to the center strip of adhesive after the picture and mat are accurately positioned on the mount.

In one form of the invention the base 12 of the mount MO is hingedly attached to the mat material MA with the mat overlying the mount MO in the finished mounted and matted picture as shown in FIGS. 1 and 2, with FIGS. 6 and 7 showing an intermediate step in which a narrow area of adhesive is uncovered by the removal of the center section 16 of the cover release sheet 14.

The mat material MA shown in FIG. 3 is provided with a grid coordinate system with the coordinates designated in a manner similar to that of the mount MO but it will be noted that the distance between the quadrants is reduced to D−.4 with each of the small divisions of the coordinate system corresponding to .2 of a space between heavy lines so that the edges of the picture P will be overlapped by the edges of the mat adjacent the picture viewing opening by a distance of .2 at each edge of the picture after the opening has been cut and the picture is in position on the mount.

Assuming that the picture P is of the size shown by the dot-dash lines 18 in FIG. 3, the outline of the picture could be designated by the coordinates of the corners, which coordinates are identified as A.3, 1.9; −A.3, 1.9; −A.3, −1.9; and A.3, −1.9.

The same four points are located on the grid coordinate system on the back of the mat material MA but it will be noted that the points are closer together by two of the small spaces and therefore the points are closer together by .4 of the space between heavy grid lines, but the coordinates are identified by the same characters A.3, 1.9; −A.3, 1.9; −A.3, −1.9; and A.3, −1.9; respectively. The mat material is cut between those points as shown in dot-dash lines 19 and a knife K is used to cut the opening 10 between these points in the mat material MA with the knife K.

From the above description, the use of the mount and mat and the structure of the mount and mat should be clear, it being noted that the combination mat and mount are arranged as shown in FIG. 3 and the picture accurately located on the mount MO and the outlines of such picture being located relative to the coordinates and being indicated by the dot-dash lines 18 and drawn between the coordinates of the corners. The coordinate points at the corners of the picture are determined and identified by their coordinate values A.3, 1.9; −A.3, 1.9; −A.3, −1.9; and A.3, −1.9. The same coordinates are located on the mat material MA and dash-dot lines 19 are drawn between adjacent coordinate points to indicate the size of the picture viewing opening. After the picture viewing opening is completely cut by the knife K along the outline 19 on the mat material, the combination mount and mat is ready to be used.

The center section 16 of the cover release sheet is removed from the mount MO and the picture accurately positioned on the mount by the dot-dash guide lines 18 or merely by the coordinates, and the center portion of the picture is depressed as shown at 20 in FIG. 7 to contact the adhesive AD, thereby temporarily fixing the position of the picture. The mat MA is then positioned over the picture and the mount MO as clearly shown in FIGS. 6 and 7. It can now be seen how the finished picture with the mat will look. If any adjustment is necessary, such adjustment can be made since the contact of the picture with the adhesive AD is in such a limited area and with such a light pressure that the picture can be repositioned if desired. Assuming the picture is in its correct position the center section of the picture and mat are pressed against the adhesive and the operator then severs the hinge connections by any suitable means if the mount and mat are hingedly connected together, and then progressively removes the cover release sheet sections I, II, III and IV from the base 12. Release sheet section I is removed by digital engagement with the release sheet section at the slit between sections I and II, raising the release sheet section I along the slit and lifting the section away from the adhesive AD and the base 12. Similarly section III is removed by digital engagement with the release sheet section adjacent the slit between section III and section IV and sections II and IV are removed by engaging the release sheet sections adjacent an edge such as the edge adjacent the slit between sections I and II and III and IV respectively and pulling the sections away.

The picture and the mat are progressively pressed into contact with the adhesive working from the center outwardly after the removal of the cover sheet sections I, II, III and IV until the picture, mat and mount become a finished single unit as shown in FIG. 1. It will be apparent that the portion of the picture and mat overlying sections I and II can be completely adhered before the cover sections III and IV are removed, if desired.

The mounted and matted picture can then be shown for display in any convenient manner including being placed in a frame of suitable dimensions.

Although the mount MO and mat material MA are shown hingedly connected together at S, the hinge connection can be entirely omitted and the mount and mat material still be used as described.

The mount MO may be a stiff cardboard base 12 with a layer AD of adhesive thereon or the mount may be a thin sheet 12 with the adhesive layer AD thereon. The adhesive may be on both faces of the base 12 for use in accordance with the prior application.

Figures 8, 8A:
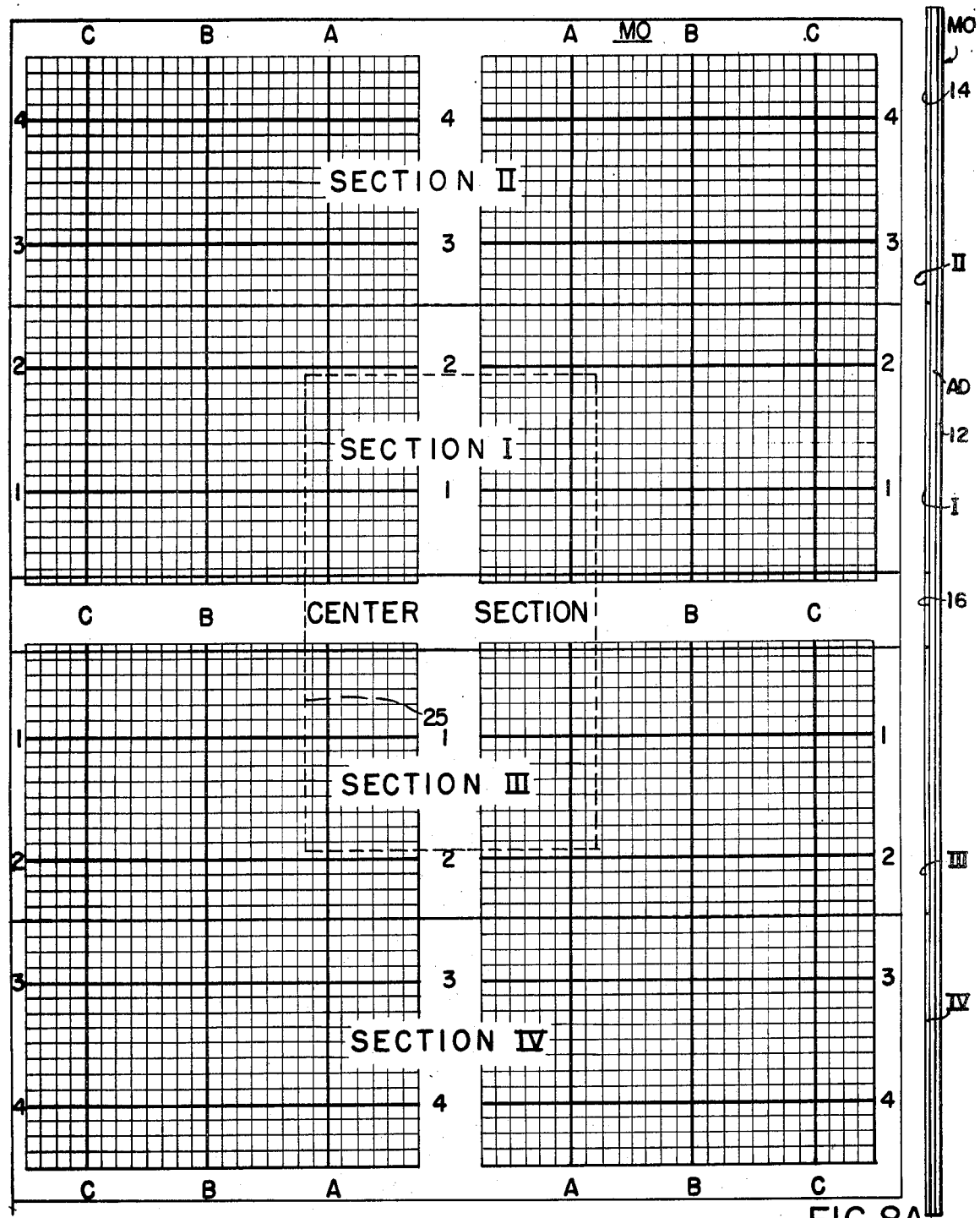
FIG. 8 is a plan of a mount showing a grid coordinate system with the grid coordinates identified at the edges as well as the center.
FIG. 8A is an edge view of the mount.

A modification of the grid coordinate system on the mount is shown in FIG. 8 having identifying indicia for the grids also along the outside margins so that when a picture is placed on the mount in the outline as shown in dotted lines 25, the coordinates can be identified by the marginal portions even though the indicia in the center portion are covered by the picture.

Figure 9:
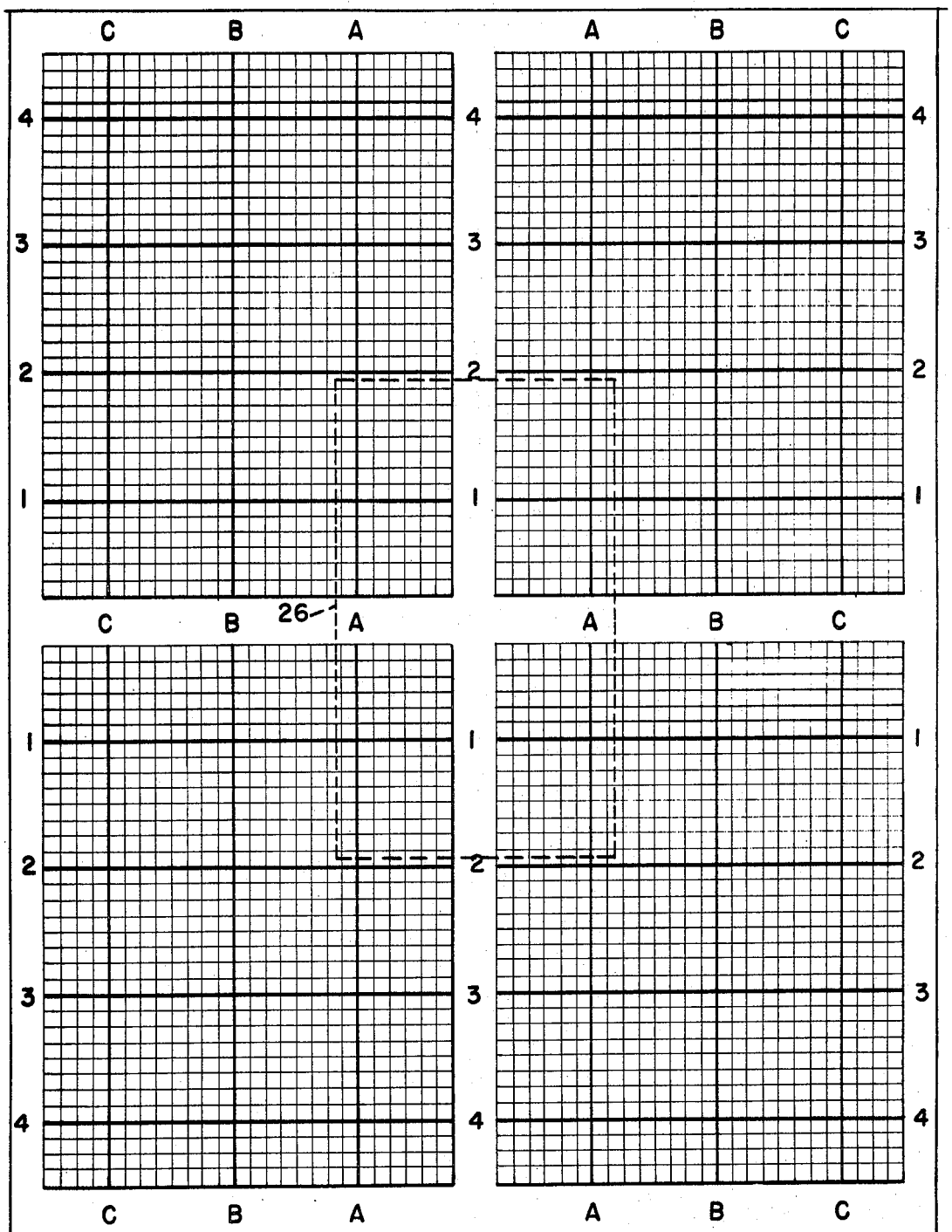
FIG. 9 is a plan of the back of a sheet of mat material showing the indicia for the grid coordinates at the edges as well as at the center to be used with the mount of FIG. 8.

The mat material shown in FIG. 9 has a similar grid system with identifying indicia along the edges as well as the center and by using the same coordinates shown in FIG. 8 the outline 26 of the picture viewing opening can be accurately located on the grid of the mat material.

The mate material is then cut along the outline 26 to produce the desired picture viewing opening as shown in the other modifications.

Figure 10:
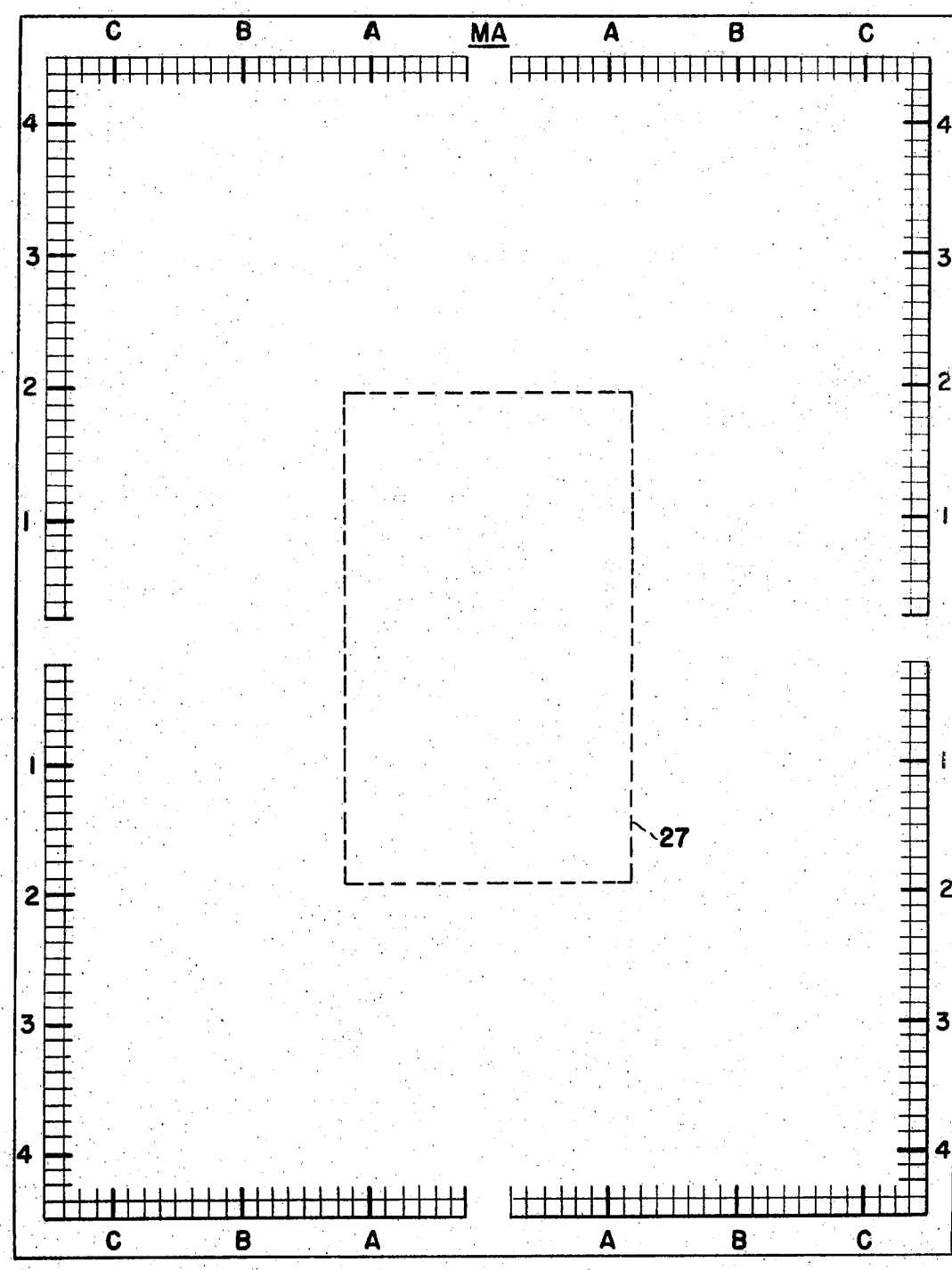
FIG. 10 is a rear view of a sheet of mat material having a grid system with the grid marks extending along the marginal portions only and identifying indicia around the margins to be used with the mount of FIG. 8.

Another modification is shown in FIG. 10 in which the back of the mat material has identifying grids around the edges thereof corresponding to those of FIG. 8 and the identifying indicia make it possible to use a straight edge between opposite grids and mark the desired outline of a picture viewing opening 27. The grid marks may be identified in the manner previously described, so the outline of the picture can have the same coordinates A.3, 1.9; −A.3, 1.9; −A.3, −1.9; A.3, −1.9.

It will be noted that the grid system of the mat material has its grid coordinates closer to the center axes than the grid system of the mount by one space at each edge so the overlap of the mat onto the picture at the edges of the picture viewing opening will be one of the small spaces as clearly shown in the other modifications. The offset may be made any amount for the amount of overlap desired.

It will also be noted that the mount shown in FIGS. 8 and 8A is similar in its characteristics to the mount shown in FIGS. 3, 4 and 5 and reference may be made to such figures for the details thereof. In the modifications shown in FIGS. 8, 9 and 10 the mount may or may not be attached to the mat material.

As regards the various forms of the grids, there are two reasons for having the indicia both in the margins of the mount and mat and centrally across them horizontally and vertically. The more important reason is that because of the variety of stock frame sizes, and the almost limitless number of sizes and proportions of pictures and the frames made to fit them, it is not practical to market sets to fit more than a few of the common frame sizes. However, the mounts and the mat material can easily be trimmed with scissors or a knife (taking equal amounts off opposite edges so as to keep the grids centered), but the indicia would frequently be trimmed off, too, if they were only in the margins. Therefore, indicia are also provided within the grid itself. The second reason is that if the grid were as illustrated in FIG. 3, a large picture might obscure the indicia.

In spite of the various forms of grids illustrated and described, the principle basic to all of them is that the guide lines on the back of the mat or mat material are offset inwardly from the guide lines on the mount so that the same points indicating the location of the picture on the mount can be used directly on the guide lines on the back of the mat material in cutting the picture-viewing opening, which will be properly located and will automatically overlap the picture at the edges of the opening, without having to make any measurements.

It is within the scope of the invention that the mat MA may be provided with a pre-cut opening to fit a standard size photo enlargement, but the mat would also have coordinate guide means printed on its back side for those who want to use the mat as a means of mounting a photograph that is larger than the opening. For example, the mat may have a pre-cut opening for a 5" x 7" enlargement in an 8" x 10" frame, but the opening can be cut using the grid to fit any size photo up to an 8" x 10" enlargement to cover unwanted portions from the edges of a photo larger than 5" x 7".

It is further within the scope of the invention that the mount board 12 may be provided without the adhesive AD and release sheet 14 but merely having the coordinate guide means such as the grid coordinate system 11 shown in FIG. 3 imprinted thereon. The user then would apply a transparent adhesive to the mount board so that the guide lines would be visible through the adhesive. The location of picture and determination of the correct viewing opening for the mat material, and cutting of same would be similar to the methods previously described.

While the mat material and mat are both designated in the drawings by the symbol MA it is to be understood that the sheet of mat material becomes a mat only after the viewing opening is cut therein.

What is claimed is:

1. The method of mounting and matting a picture comprising providing integral coordinate guide means marking equal distance intervals extending horizontally and vertically in opposite directions from intersecting horizontal and vertical axes through a selected central point on a mount, providing integral identifying means for selected of said coordinate guide means, applying integral coordinate guide means and identifying means on a sheet of picture mat material similar to the coordinate guide means and identifying means on said mount with the coordinate guide means and identifying means on said mat material corresponding to the coordinate guide means and identifying means on said mount being closer to said horizontal and vertical axes by the amount of the desired overlap of the mat onto the picture at the edges of the picture viewing opening, positioning the picture on the mount to determine the coordinates of the boundary thereof, cutting a picture viewing opening in the mat material on the same identified coordinates as the location of the picture on the mount, and adhesively securing the mount, mat and picture in accurate location.

2. The invention according to claim 1 in which the mount comprises a base coated on at least one side with a pressure sensitive adhesive which is protected by a cover release sheet.

3. The invention according to claim 2 in which the release sheet is cut into sections whereby one section may be removed and the picture and mat placed over the mount and accurately located without adhering contact of the picture or mat to the mount and then pressed into adhering contact with the adhesive uncovered by the removal of the said one section of the cover release sheet.

4. The invention according to claim 3 in which the coordinate guide means includes coordinate guide lines imprinted on at least one of the cover release sheet and mount base.

5. The invention according to claim 4 in which the release sheet is imprinted with the guide lines.

6. The invention according to claim 4 in which the mount base is imprinted with the guide lines and the adhesive is transparent.

7. The invention according to claim 3 in which both the cover release sheet and mount base are imprinted with the guide lines.

8. The invention according to claim 3 wherein the remaining release sheet sections are removed and the remainder of the picture and mat are pressed into contact with the pressure sensitive adhesive.

9. Material for mounting and matting a picture comprising a mount with coordinate integral guide means marking equal distance intervals extending horizontally and vertically in opposite directions from intersecting horizontal and vertical axes through a selected central point on said mount, integral identifying means for selected of said coordinate guide means, and a sheet of mat material having integral coordinate guide means and identifying means similar to the coordinate guide means and identifying means on said mount for use as guides in cutting a picture viewing opening through the mat material, the coordinate guide means and identifying means on said mat material corresponding to the coordinate guide means and identifying means on said mount being closer to said horizontal and vertical axes by the amount of the desired overlap of the mat onto the edges of the picture at the edges of the picture viewing opening.

10. The invention according to claim 9 in which the mount and mat are hingedly connected together.

11. The invention according to claim 9 in which the mount comprises a base coated with a layer of adhesive.

12. The invention according to claim 9 in which the adhesive is a pressure sensitive adhesive and a cover release sheet is applied thereover.

13. The invention according to claim 9 in which the cover release sheet is in sections which may be separately removed.

14. The invention according to claim 9 in which the coordinate guide means comprises guide lines and said identifying means comprises indicia marks identifying selected guide lines.

15. The invention set forth in claim 14 wherein said indicia marks are positioned along the edges of the mount and the sheet of mat material.

16. The invention set forth in claim 14 wherein said indicia marks are positioned along the edges as well as along said horizontal and vertical axes of said mount and said sheet of mat material.

17. The invention according to claim 9 in which the coordinate guide means on said sheet of mat material comprises equally spaced distance marks along the edges only of said sheet of mat material on one side of said sheet so that lines can be drawn from opposite marks to determine the correct outline of the picture viewing opening of the mat.

18. The invention according to claim 9 in which the coordinate guide means on said mat comprises identifying marks along the edges only as the means to identify coordinates so that lines can be drawn from opposite coordinates to determine the correct outline of the picture viewing opening of the mat.

19. The invention set forth in claim 14 in which the sheet of mat material has a pre-cut opening therein.

20. The invention set forth in claim 1 wherein said mount comprises a base coated with a layer of adhesive.

21. The method of mounting and matting a picture comprising providing integral guide means marking distance intervals extending in opposite directions from a selected point on a mount, providing integral guide means on a sheet of picture mat material similar to the guide means on said mount with the guide means on said mat material corresponding to the guide means on said mount being closer to said point by the amount of the desired overlap of the mat onto the picture at the edges of the picture viewing opening, positioning the picture on the mount to determine the boundary thereof, cutting a picture viewing opening in the mat material on the same identified boundary as the location of the picture on the mount, and securing the mount, mat, and picture in accurate location.

22. Material for mounting and matting a picture comprising mount material, integral guide means on said mount material marking distance intervals extending in opposite directions from a selected point on the mount, mat material for cooperation with the mount, said mat material having similar guide means to the integral guide means on said mount with the guide means on said mat material corresponding to the guide means on said mount but being closer to said point by the amount of the desired overlap of the mat onto the picture at the edges of the picture viewing opening whereby a picture can be positioned on the mount and the guide means on the mount defining the boundary of the location of the picture on the mount so that the corresponding boundary guide means may be identified on the mat and the picture viewing opening cut through the mat on said corresponding boundary guide means on the mat material, and the mount mat and picture may be secured together in cooperating relation.

23. The invention according to claim 3 in which one release sheet section is sufficiently narrow that when such narrow release sheet section is removed the picture will bridge the adhesive without adhering contact until the picture is positively pressed into adhering contact.

24. The invention according to claim 23 in which the narrow release sheet section is a central section.

25. The invention according to claim 13 in which one release sheet section is sufficiently narrow that when such narrow release sheet section is removed the picture will bridge the adhesive without adhering contact until the picture is positively pressed into adhering contact.

26. The invention according to claim 25 in which the narrow release sheet section is a central section.

References Cited
UNITED STATES PATENTS

| | | | |
|---|---|---|---|
| 2,504,332 | 4/1950 | Horwitt | 40—159 |
| 3,024,553 | 3/1962 | Rowley | 40—158 R |

FOREIGN PATENTS

| | | | |
|---|---|---|---|
| 987,005 | 3/1965 | Great Britain | 40—158 R |

BENJAMIN A. BORCHELT, Primary Examiner

G. E. Montone, Assistant Examiner

U.S. Cl. X.R.

40—158 R, 159; 156—108